US012625843B2

(12) United States Patent　　　　(10) Patent No.:　　US 12,625,843 B2

Amaro et al.　　　　　　　　　　　　(45) Date of Patent:　　May 12, 2026

(54) TOWER LIGHT DYNAMIC REGISTER POPULATION ENGINE PARSING UNIQUE FIELD-GENERATED PERFORMANCE STRING

(71) Applicant: Banner Engineering Corp., Minneapolis, MN (US)

(72) Inventors: Abdi Amaro, Minneapolis, MN (US); Robb Weidemann, Minneapolis, MN (US); Arthur Padget, Minneapolis, MN (US)

(73) Assignee: Banner Engineering Corp., Minneapolis, MN (US)

( * ) Notice: Subject to any disclaimer, the term of this patent is extended or adjusted under 35 U.S.C. 154(b) by 0 days.

(21) Appl. No.: 18/997,213

(22) PCT Filed: Aug. 5, 2022

(86) PCT No.: PCT/US2022/074629

§ 371 (c)(1),
(2) Date: Jan. 21, 2025

(87) PCT Pub. No.: WO2024/030157

PCT Pub. Date: Feb. 8, 2024

(65) Prior Publication Data

US 2025/0265222 A1　　Aug. 21, 2025

(51) Int. Cl.
G06F 15/78　　　　(2006.01)
G08B 5/38　　　　(2006.01)

(52) U.S. Cl.
CPC ............ G06F 15/7871 (2013.01); G08B 5/38 (2013.01)

(58) Field of Classification Search
CPC ................. G06F 15/177; G06F 15/781; G06F 15/7867; G06F 15/7871; G06F 15/7896; G08B 5/36; G08B 5/38; G05B 19/42
See application file for complete search history.

(56) References Cited

U.S. PATENT DOCUMENTS 8,024,492 B2 * 9/2011 Syed ...................... G01D 4/004
　　　　　　　　　　　　　　　　　　　　710/9
9,578,090 B1 * 2/2017 MacVittie ............... H04L 67/34
(Continued)

FOREIGN PATENT DOCUMENTS

CN　　　204425718 U　　6/2015
CN　　　105681071 A　　6/2016
(Continued)

OTHER PUBLICATIONS

Chapter II Demand Brief filed in the European Patent Office on Dec. 21, 2023 in Application No. PCT/US2022/074629, 20 pages.
(Continued)

*Primary Examiner* — Thomas J. Cleary

(74) *Attorney, Agent, or Firm* — Thompson Patent Law Offices PC

(57)　　　　　　　ABSTRACT

Apparatus and associated methods relate to configure a reconfigurable device. In an illustrative example, a device programming module (DPM) of the reconfigurable device may receive a user input indicating a model number of a legacy device. The DPM, for example, may identify the user-selected functions based on a first set of rules to determine predetermined functions of the legacy device. The DPM, for example, may generate a binary machine instruction code to configure the reconfigurable device to perform the identified predetermined device functions. The DPM may then transmit the binary machine instruction code to the reconfigurable device such that the reconfigurable device is configured to operate as the legacy device identified. Various embodiments may advantageously eliminate a need for studying the complete functionalities of the legacy device before programming the reconfigurable device, and a need for assigning unique part numbers to replacements of the legacy devices.

22 Claims, 4 Drawing Sheets

(56) References Cited

U.S. PATENT DOCUMENTS

| | | | |
|---|---|---|---|
| 10,497,337 | B2 | 12/2019 | Rains, Jr. et al. |
| 10,973,110 | B1 | 4/2021 | Fails et al. |
| 11,855,840 | B2* | 12/2023 | Pingale .................. H04L 41/12 |
| 12,206,546 | B2* | 1/2025 | Bravo ................. H04L 41/0846 |
| 2003/0070063 | A1* | 4/2003 | Boyle ..................... H04L 67/34 |
| | | | 713/2 |
| 2010/0034119 | A1* | 2/2010 | Van Steen ............. H04W 4/029 |
| | | | 370/254 |
| 2011/0215725 | A1 | 9/2011 | Paolini |
| 2014/0080478 | A1* | 3/2014 | Costelloe ............. H04W 24/04 |
| | | | 379/32.01 |
| 2016/0013988 | A1* | 1/2016 | Andrews ............... H04L 41/044 |
| | | | 709/223 |
| 2016/0165439 | A1 | 6/2016 | Chen et al. |
| 2017/0264950 | A1* | 9/2017 | Gerhards ........... H04N 21/4334 |
| 2018/0089343 | A1 | 3/2018 | Atta et al. |
| 2018/0109650 | A1* | 4/2018 | Berdy ................... H04L 63/123 |
| 2018/0299370 | A1* | 10/2018 | Preischel .......... G01R 19/0084 |
| 2018/0321933 | A1* | 11/2018 | Kondapi ................. G06F 8/656 |
| 2020/0170094 | A1 | 5/2020 | Magielse et al. |
| 2020/0301686 | A1* | 9/2020 | Games ................ G06F 9/44505 |
| 2021/0099861 | A1* | 4/2021 | Surles ................. G06F 9/44505 |
| 2021/0243077 | A1* | 8/2021 | Gupta ................. H04L 63/0823 |
| 2022/0060377 | A1* | 2/2022 | Cagle ................. H04L 41/0879 |
| 2022/0377798 | A1* | 11/2022 | Chien ................... H04L 1/1812 |
| 2022/0413875 | A1* | 12/2022 | Mecham ................... G06F 1/26 |
| 2023/0403192 | A1* | 12/2023 | Wagener ............. G05B 19/418 |
| 2024/0263825 | A1* | 8/2024 | Topf ......................... F24F 11/50 |

FOREIGN PATENT DOCUMENTS

| | | | |
|---|---|---|---|
| CN | 108064110 | A | 5/2018 |
| CN | 108184291 | A | 6/2018 |
| CN | 108475317 | A | 8/2018 |
| CN | 109563971 | A | 4/2019 |
| CN | 109863828 | A | 6/2019 |
| CN | 110088734 | A | 8/2019 |
| CN | 110583100 | A | 12/2019 |
| CN | 112463206 | A | 3/2021 |

OTHER PUBLICATIONS

Intermediate Response to Invitation to Submit Replacement Sheets in Art. 34 Amendments, filed with the European Patent Office on Feb. 6, 2024, in Application No. PCT/US2022/074629, 24 pages.

International Preliminary Report on Patentability, issued on Jul. 24, 2024 by the European Patent Office, in Application No. PCT/US2022/074629, 6 pages.

International Search Report and Written Opinion, issued by the European Patent Office on Mar. 22, 2023, in Application No. PCT/US2022/074629, 10 pages.

Minutes of Oral Consultation with the Examiner on Apr. 22, 2024, in Application No. PCT/US2022/074629, 3 pages.

Second Intermediate Response Under Rule 66, filed with the European Patent Office on May 6, 2024, in Application No. PCT/2022/074629, 28 pages.

* cited by examiner

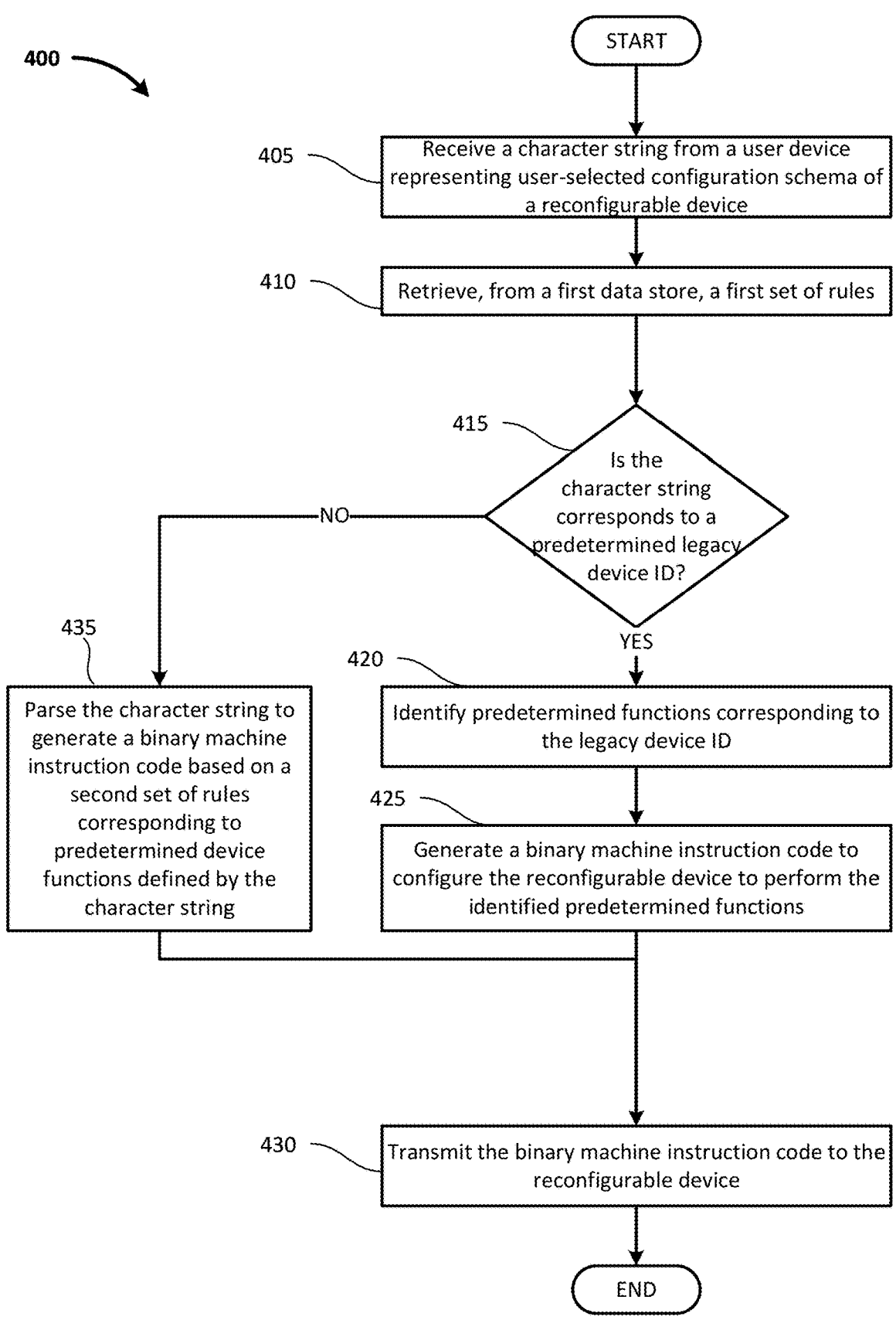

400

START

405 — Receive a character string from a user device representing user-selected configuration schema of a reconfigurable device 410 — Retrieve, from a first data store, a first set of rules 415 — Is the character string corresponds to a predetermined legacy device ID?

NO

435

Parse the character string to generate a binary machine instruction code based on a second set of rules corresponding to predetermined device functions defined by the character string

YES

420 — Identify predetermined functions corresponding to the legacy device ID

425 — Generate a binary machine instruction code to configure the reconfigurable device to perform the identified predetermined functions 430 — Transmit the binary machine instruction code to the reconfigurable device

END

FIG. 4

TOWER LIGHT DYNAMIC REGISTER POPULATION ENGINE PARSING UNIQUE FIELD-GENERATED PERFORMANCE STRING

CROSS-REFERENCE TO RELATED APPLICATIONS

This application is a national stage application under 35 U.S.C. 371 of and claims the benefit of PCT/US2022/074629, titled "Tower Light Dynamic Register Population Engine Parsing Unique Field-Generated Performance String," filed by Abdi Amaro, Robb Weidemann, and Arthur Padget, on Aug. 5, 2002.

TECHNICAL FIELD

Various embodiments relate generally to methods and apparatus to emulate legacy products.

BACKGROUND

In an industrial environment (e.g., a factory floor), tower lights (sometimes also called stacked lights, indicator lights, industrial signal lights) may be used to provide visual and/or sometimes audible indicators of a status of a machine or a process. For example, based on visual indicia of the tower lights, a production manager may dispatch technicians, workers, and/or additional operators to regions of a production floor that requires maintenance.

In some examples, a tower light may include illumination indicators such as one or more light emitting diode circuits. In some examples, a tower light may include one or more xenon lights. For example, the tower light may include a stacked structure having a variety of shapes and color of indicator segments on top of each other. Based on a control signal (e.g., a signal representing a status of a machine), the tower light may illuminate one or more indication segments corresponding to a predetermined code known to personnel on the factory floor. In some examples, the predetermined code may include a static illumination of one or more indication segments, or an animation (e.g., flashing) of one or more indication segments.

SUMMARY

Apparatus and associated methods relate to configure a reconfigurable device. In an illustrative example, a device programming module (DPM) of the reconfigurable device may receive a user input indicating a model number of a legacy device. The DPM, for example, may identify the user-selected functions based on a first set of rules to determine predetermined functions of predetermined legacy devices. The DPM, for example, may generate a binary machine instruction code to configure the reconfigurable device to perform the identified predetermined device functions. The DPM may then transmit the binary machine instruction code to the reconfigurable device such that the reconfigurable device is configured to operate as the legacy device identified. Various embodiments may advantageously eliminate a need for studying the complete functionalities of the legacy device before programming the reconfigurable device, and/or a need for assigning unique part numbers to replacements of the legacy devices.

Various embodiments may achieve one or more advantages. For example, some embodiments may advantageously parse the user input into a binary machine instruction code based on a second set of rules corresponding to predetermined device functions defined by the character string when the user input does not correspond to the predetermined legacy devices. Some embodiments may generate the binary instruction code based on a set of parameters corresponding to a set of programmable functionalities of the reconfigurable device. Some embodiments may, in response to determining predetermined device functions, automatically populate a functionality configuration table of a user display. Some embodiments may generate a data structure defining the predetermined device functions according to a predetermined configuration schema.

The details of various embodiments are set forth in the accompanying drawings and the description below. Other features and advantages will be apparent from the description and drawings, and from the claims.

BRIEF DESCRIPTION OF THE DRAWINGS

FIG. 4 is a flowchart illustrating an exemplary configuration method.

Like reference symbols in the various drawings indicate like elements.

DETAILED DESCRIPTION OF ILLUSTRATIVE EMBODIMENTS

Figure 1:
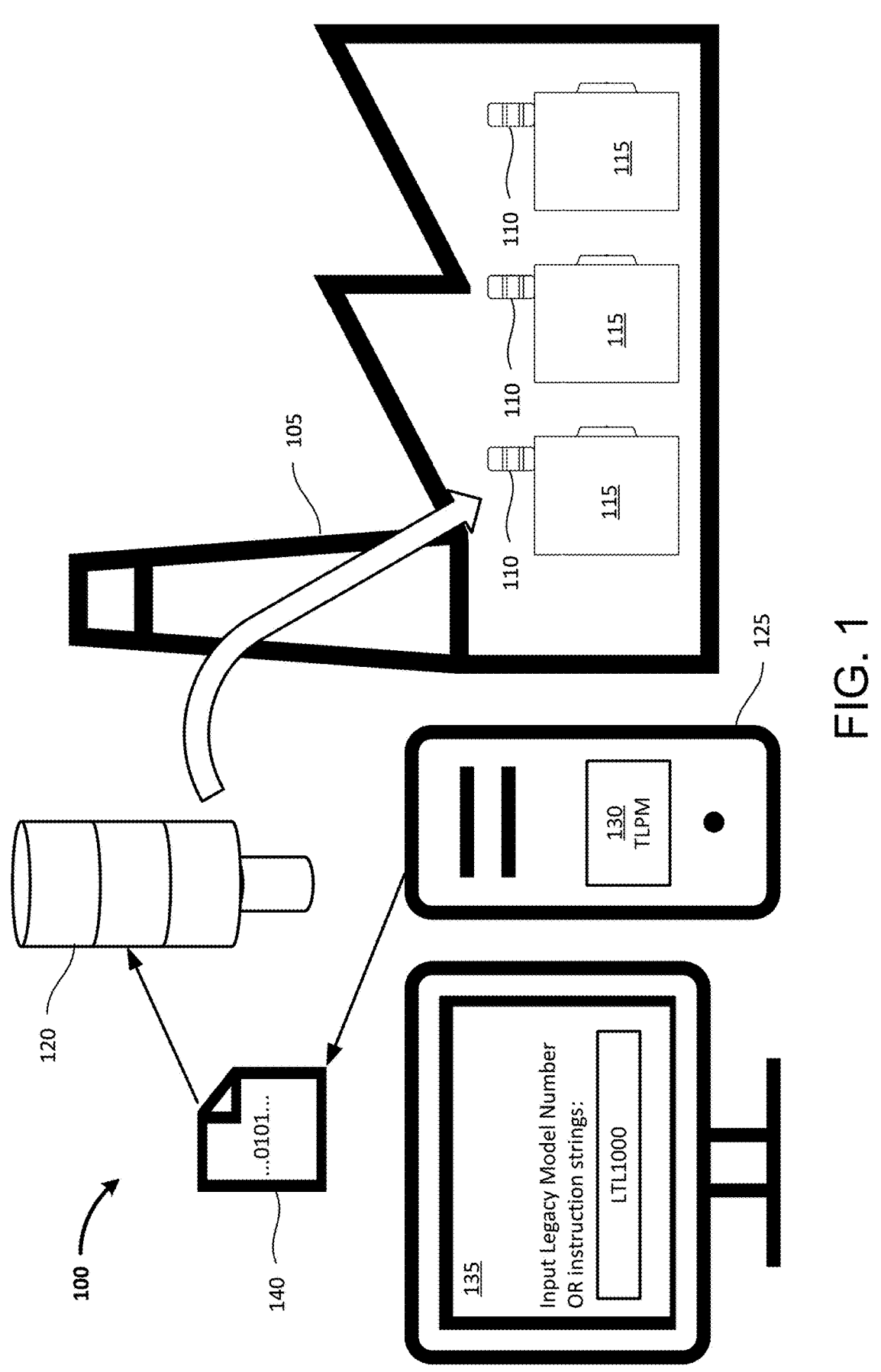
FIG. 1 depicts an exemplary Tower Light Programming Module (TLPM) employed in an illustrative use-case scenario.

FIG. 1 depicts an exemplary Tower Light Programming Module (TLPM) employed in an illustrative use-case scenario 100. In an exemplary reconfigurable tower light scenario 100, a factory 105 includes multiple legacy tower lights (LTLs 110). For example, the LTLs 110 may be attached to machines 115 in the factory 105. For example, workers in the factory 105 may read signals transmitted by the LTLs 110 and interpret a status of the machines 115 (e.g., machines working in good condition, machines requiring maintenance, machines having safety issues).

In some examples, the LTLs 110 may be configured in a specific configuration that is used in the factory 105. For example, the LTLs 110 may be configured to include a flashing red at a top portion. For example, the LTLs 110 may be configured to include a cycling yellow light in a middle portion. For example, the LTLs 110 may be configured to include a static green light in a bottom portion. The LTLs 110 may, for example, be used in the factory 105 for a long time.

In some implementations, each of the LTLs 110 may be configured differently from one another. For example, the machine 115 may use the particular LTL 110 that is different from another LTL within the factory 105. Various LTLs may, by way of example and not limitation, have different configurations. The configurations may be hardwired and/or pre-assembled such that the operation of each LTL is fixedly determined (e.g., without physical reconfiguration).

In some examples, the LTLs 110 may be made by stacking various color Light Emitting Diode (LED) panels in an order defined by a model number. In operation, supporting LTL models with different stack orders and/or color combinations may be difficult. For example, workers in the factory 105 may be trained to the signals transmitted by the LTLs 110 so that changing a signal format of tower lights may be costly. The factory 105 may purchase new LTLs 110 with the same model number when, for example, one of the LTLs 110 is to be replaced.

In the scenario 100, for example, a reconfigurable tower light (RTL 120) may be purchased to be used in the factory 105. In some implementations, the RTL 120 may support multiple combinations of possible display configurations (made possible by different stack orders and/or color combinations of LED panels) of the LTL 110. In some implementations, the RTL 120 may include one or more RGB LEDs on a controlling circuit (e.g., a vertical printed circuit board (PCB)). For example, the RGB LEDs may be configured to display multiple color combinations on the RTL 120 controlled by the controller running a controlling software. In some implementations, one model of the RTL 120 may be used to replace various models of the LTLs 110 by programming the controller to operate the RTL 120 in a same configuration as a replaced LTL.

In this example, a user may use a computing device 125 to configure the RTL 120. For example, the computing device 125 may be a desktop computer. For example, the computing device 125 may be a mobile computing device. In some examples, the computing device 125 may be a server accessed by a user device via a network (the Internet).

The computing device 125 includes a tower light programming module (TLPM 130). For example, the TLPM 130 may be executed by the computing device 125 to program the RTL 120. In various implementations, the TLPM may automatically configure the RTL 120 to match a LTL model based on a string. In some implementations, the string may be received from a peripheral device (e.g., a file within a storage device such as a USB drive). The TLPM 130, in some implementations, may receive user input. In this example, the user may present a Legacy Model Number (LMN) or instruction strings to the computing device 125. As shown on a user interface 135, a user may input a LMN (as "LTL1000" in this example) of the LTL 110 to obtain the exact same performance of the LTL 110 from the RTL 120. For example, with the user interface 135, the user may not be required to know a model scheme or specific device behavior of the LTL 110. Using the LMN of the LTL 110, the user may obtain a same performance of the LTL 110.

The TLPM 130, in some implementations, may generate a configuration data structure (CDS 140). In some implementations, the CDS may be a set of binary machine instruction code. For example, the set of binary machine instruction code may include an identification string to be programmed onto a non-volatile memory of the RTL 120. In some implementations, the CDS 140 may include a character encoded string containing, for example, color, animation, animation pattern, animation speed and color intensity configuration of each segment in the RTL 120.

In some implementations, the CDS 140 may include a configuration schema readable by a controller of the RTL 120. For example, the configuration schema may include a mapping of, for example, a color and/or operating characteristics (e.g., animation, brightness) to a region of the RGB LEDs. In some examples, the configuration schema may specify other characteristics including sound of the RTL 120 and text display on the RTL 120.

In the depicted example, the CDS 140 may be transmitted to the RTL 120 to configure the function of the RTL 120 according to the user input. For example, the CDS 140 may be flashed into a memory device (e.g., an onboard data register) of the RTL 120. In some examples, the RTL 120 may generate a configuration table from the CDS 140 according to a predetermined schema for the RTL 120 corresponding to predetermined device functions of the LTLs 110.

In some implementations, the CDS 140 may be transmitted (e.g., through wire and/or wirelessly) to the RTL 120. For example, the RTL 120 may save the received CDS 140 into the memory device. After receiving the CDS 140, the RTL 120 may generate configuration parameters according to a predetermined set of configuration rules stored in an onboard data registry of the RTL 120. For example, the controller of the RTL 120 may operate the RTL 120 according to the configuration parameters. In various examples, after the CDS 140 is programmed into the RTL 120, the RTL 120 may automatically be configured to a configuration specified by the CDS 140. In various implementations, the TLPM 130 may advantageously eliminate a need for assigning unique part numbers to replacements of the LTL 110.

For example, after the LTL 110 is no longer supported, the factory 105 may purchase the RTL 120 as replacement. Without the TLPM 130, an engineer, who is asked to configure the RTL 120 to behave exactly the same as the LTL 110, may be required to understand both the historical behavior of the LTL 110 and the programming language to configure the RTL 120. Using the CDS 140 generated by the TLPM 130, the engineer may quickly replace the LTLs 110 by simply entering the LMN of the LTL 110.

Figure 2:
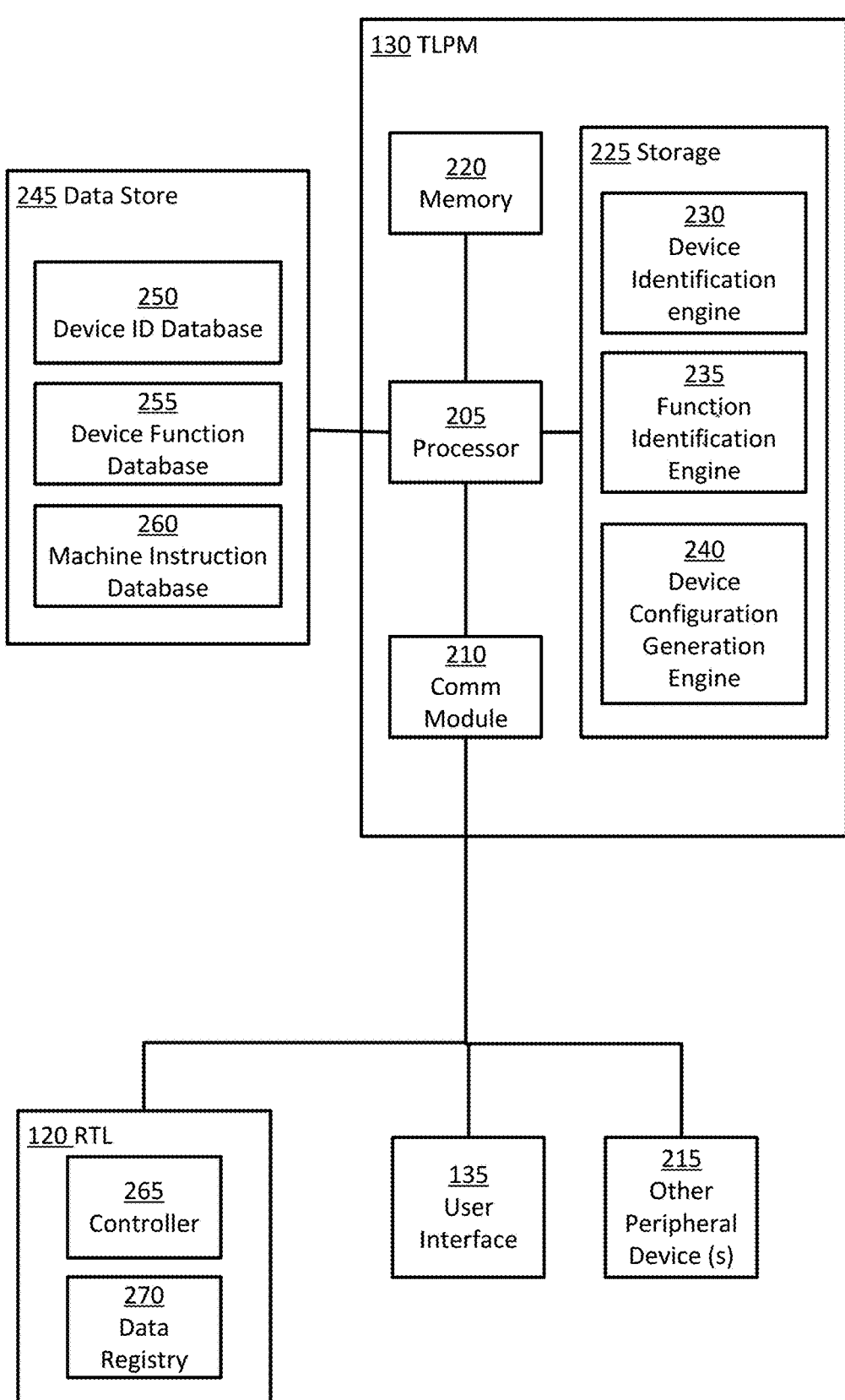
FIG. 2 is a block diagram depicting an exemplary system for programming a reconfigurable tower light.

FIG. 2 is a block diagram depicting an exemplary system for programming a reconfigurable tower light. In the depicted example, the TLPM 130 includes a processor 205. The processor 205 may, for example, include one or more processing units. The processor 205 is operably coupled to a communication module 210. The communication module 210 may, for example, include wired communication. The communication module 210 may, for example, include wireless communication. In the depicted example, the communication module 210 is operably coupled to the RTL 120, the user interface 135, and other peripheral devices 215. For example, the peripheral devices 215 may include user input devices (e.g., a keyboard, a user interface pointer device). A user may, for example, use the peripheral device to input a character string representing a LMN of the LTL 110 to the TLPM 130. In some implementations, the peripheral devices 215 may include a portable storage device (e.g., a USB drive). For example, the portable storage device may store the CDS 140 generated by the TLPM 130. The RTL 120, for example, may be configured to receive the CDS 140 stored in the portable storage device and/or from the communication module 210.

The processor 205 is operably coupled to a memory module 220. The memory module 220 may, for example, include one or more memory modules (e.g., random-access memory (RAM)). The processor 205 includes a storage module 225. The storage module 225 may, for example, include one or more storage modules (e.g., non-volatile memory). In the depicted example, the storage module 225 includes a device identification engine (DIE 230), a function identification engine (FIE 235), and a device configuration generation engine (DCGE 240).

In some implementations, the DIE 230 may generate a device identifier for programming the RTL 120 from, for example, a user input string containing a LMN or a configuration instruction. For example, upon receiving the LMN "LTL1000" from the user input device, the DIE 230 may automatically generate a device identifier (e.g., a character string) corresponding to the LMN. For example, the DIE 230 may, upon identifying that the user input does not correspond to any legacy devices, pass the user input to the DCGE 240 for further processing.

The FIE 235, for example, may determine predetermined functions of a legacy device as a function of the device identifier generated by the DIE 230. The predetermined functions may include, for example, the color, animations, and other behaviors of the legacy devices. For example, the identified predetermined functions may be transmitted to the DCGE 240 for generating the CDS 140 for programming the RTL 120. The FIE 235, in some implementations, may automatically populate a functionality configuration table displaying the functions of the reconfigurable device based on the device identifier. In some implementations, in response to determining predetermined device functions as a function of the character string, the FIE 235 may generate a signal configured to automatically populate a functionality configuration table of a user display (e.g., on the user interface 135). For example, the functionality configuration table may include visual indicia (e.g., check box, sliding input, radio buttons) to map available settings of the RTL 120 to the predetermined device functions.

The DCGE 240, in some implementations, may generate the CDS 140 based on the predetermined functions and/or a set of parameters corresponding to a set of programmable functionalities of the RTL 120. For example, the set of parameters may include physical and/or functional limitations of the RTL 120 (e.g., size and dimension, animation rate, intensity limitations). In some implementations, the DCGE 240 may generate the CDS 140 by interpreting and identifying user selected functionalities for the RTL 120 based on the user input string. For example, the DCGE 240 may parse the user input into the CDS 140 to configure the RTL 120 according to device functions defined by the character string.

The processor 205 is further operably coupled to the data store 245. The data store 245, as depicted, includes a device ID database 250, a device function database 255, and a machine instruction database 260. In some implementations, the device ID database 250 may store a predetermined LMN recognizable by the TLPM 130. For example, the DIE 230 may access the device ID database 250 to determine whether a user input corresponds to a predetermined LMN. For example, if the DIE 230 cannot match the user input to the predetermined LMN stored in the device ID database, then the DIE 230 may determine that the user input corresponds to a user instruction string, containing user selected functionalities for the RTL 120. '

After receiving the device identifier from the DIE 230, for example, the FIE 235 may access the device function database 255 to determine predetermined functions of legacy devices. For example, the device function database 255 may include a configuration schema mapping between the LMN and functions of the LMN. In some implementations, the device function database 255 may generate a data structure (e.g., in json format, xml format, csv format) as a function of the LMN. For example, the DCGE 240 may use the generated data structure to generate the CDS 140. In some implementations, the DCGE 240 may access the machine instruction database 260 to generate the CDS 140 as a function of the generated data structure of the predetermined functions. For example, the machine instruction database 260 may include a mapping between a model number of the RTL 120 and the predetermined functions. For example, the DCGE 240 may use the mapping to generate a binary machine instruction code that, once stored in the RTL 120, may configure the RTL 120 to perform as the LTL 110. In some implementations, the DCGE 240 may generate the CDS 140 as a function of the user input corresponding to user selected functionalities of the RTL 120.

As shown in FIG. 2, the RTL 120 includes a controller 265 and an onboard data registry 270. For example, the binary machine instruction code generated by the TLPM 130 may include configuration parameters readable to the controller 265 (corresponding to predetermined available functions). In some implementations, the onboard data registry 270 may store the CDS 140 transmitted from the TLPM 130. In various examples, the controller 265 may operate the RTL 120 according to the configuration parameters stored in the onboard data registry 270.

In various implementations, the TLPM 130 may receive a character string as user input. If the character string corresponds to a legacy device ID (e.g., a LMN), for example, the TLPM 130 may generate a binary machine instruction code by a first set of rules (matching of a LMN in the device ID database 250) to configure the RTL 120 according to predetermined device functions associated with the legacy device ID identified by the FIE 235. If, for example, the character string does not correspond to a LMN stored in the device ID database 250, the TLPM may parse the character string by a second set of rules (using the machine instruction database 260) into a binary machine instruction code to configure the RTL 120 according to device functions defined by the character string.

Figure 3:
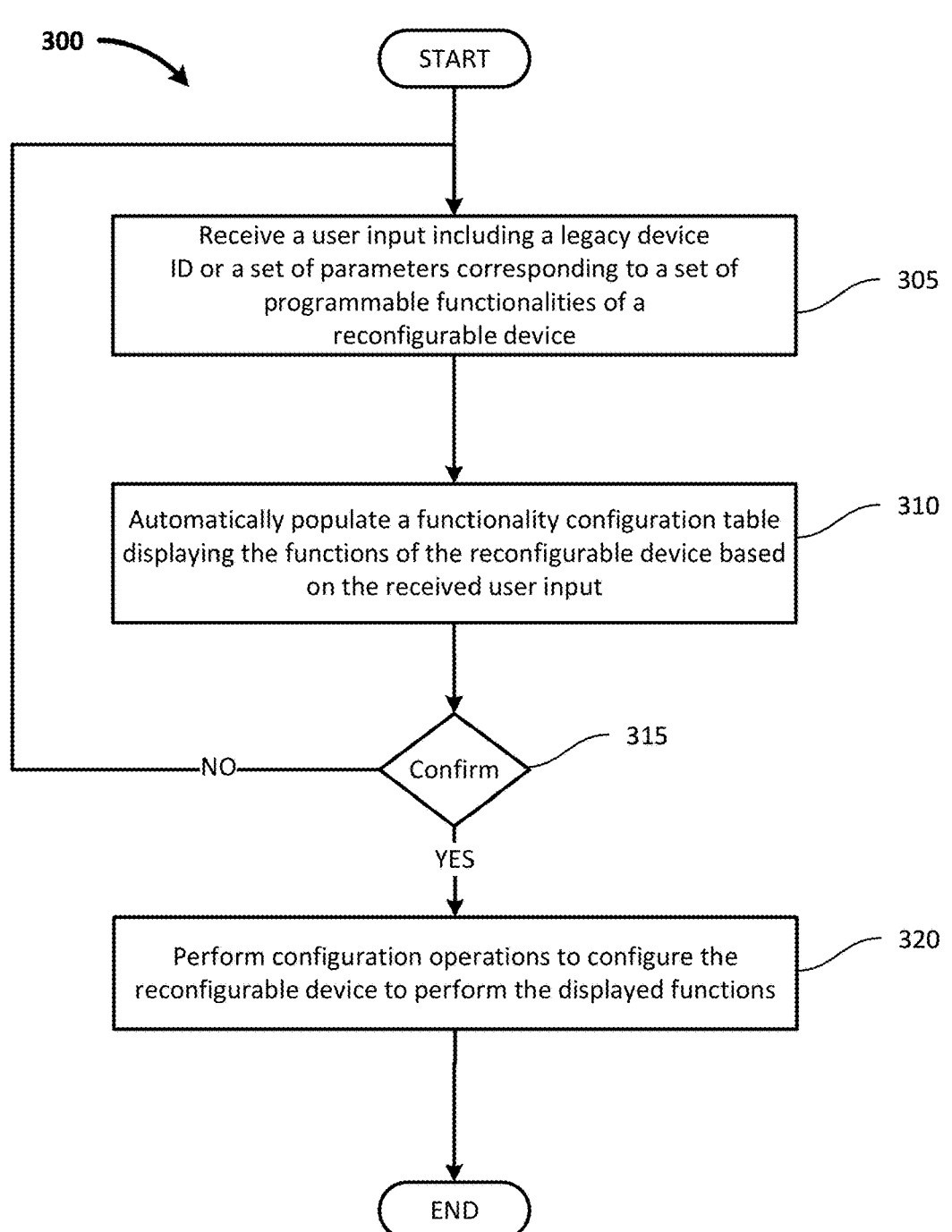
FIG. 3 is a flowchart illustrating an exemplary user input method.

FIG. 3 is a flowchart illustrating an exemplary user input method 300. For example, a TLPM 130 may execute the method 300 to receive user input from a user input device. The method 300 begins when a user input including a legacy device ID or a set of parameters corresponding to a set of programmable functionalities of a reconfigurable device is received in step 305. For example, the TLPM 130 may receive the user input using the computing device 125. In step 310, a functionality configuration table displaying the functions of the reconfigurable device based on the received user input is automatically populated. For example, based on the user input, the FIE 235 may populate a functionality configuration table to be displayed on the user interface 135. Next, in a decision point 315, it is determined whether a confirmation is received from the user device. If a confirmation is not received, then the step 305 is repeated. If a confirmation is received, in step 320, configuration operations are performed to configure the reconfigurable device to perform the displayed functions, and the method 300 ends. For example, the configuration operations may include steps to generate a machine instruction code and/or program the RTL 120 using the generated code. Some examples of the configuration operations are described with reference to FIG. 4.

FIG. 4 is a flowchart illustrating an exemplary configuration method 400. For example, the TLPM 130 may perform the method 400 to generate the CDS 140 to program the RTL 120. In this example, the method 400 begins when a character string from a user device representing user-selected configuration schema of a reconfigurable device is received in step 405. For example, the computing device 125 may receive a user input when the user interface 135 is displaying. In step 410, a first set of rules are retrieved from a first data store. For example, the DIE 230 may retrieve LMNs of legacy devices from the device ID database 250. Next, in a decision point 415, it is determined whether the character string corresponds to a predetermined legacy device ID. If it is determined that the character string corresponds to a predetermined legacy device ID, in step 420, predetermined functions are retrieved corresponding to the legacy device ID. For example, the FIE 235 may identify the predetermined function of the LTL 110 using the LMN of the LTL 110 to access the device function database 255. Next, a binary machine instruction code is generated to configure the reconfigurable device to perform the identified predetermined functions in step 425. For example, the DCGE 240 may generate the CDS 140 based on the identified predetermined functions using the machine instruction database 260. After the binary machine instruction code is generated, in step 430, the binary machine instruction code is transmitted to the reconfigurable device, and the method 400 ends. For example, the CDS 140 may be transmitted through a data wire or wirelessly to the RTL 120. In some examples, the CDS 140 may be stored in a portable storage and be flashed into the onboard data registry 270 of the RTL 120.

In the decision point 415, if it is determined that the character string does not corresponds to a predetermined legacy device ID, in step 435, the character string is parsed to generate a binary machine instruction code based on a second set of rules corresponding to predetermined device functions defined by the character string, and the step 430 is repeated. For example, the DCGE 240 may generate the binary machine instruction code by accessing the machine instruction database 260 with the character string as one of the parameters.

Although various embodiments have been described with reference to the figures, other embodiments are possible. For example, the TLPM 130 may be applied to other automation tools including machineries and/or other safety devices (e.g., safety light curtains) to enable quick replacements of legacy device models with new reconfigurable models.

For example, in some implementations, a character string (e.g., legacy device ID, corresponding character string, hexadecimal character string), such as a character string defining device functions, may be limited to a predetermined character range (e.g., maximum, minimum). For example, a character string may be limited to a maximum number of characters (e.g., advantageously improving human usability for interaction). The character string may, for example, have no more than 30 characters. In some examples, the character string may, for example, have no more than 20 characters. For example, a character string may have between 2 and 50 characters. In some implementations, a character string may, for example, be between 5 and 40 characters. In some implementations, by way of example and not limitation, a character string may be between 19-30 characters.

Although an exemplary system has been described with reference to the figures, other implementations may be deployed in other industrial, scientific, medical, commercial, and/or residential applications. In some implementations, the TLPM 130 may be embedded within the RTL 120. For example, a user may be connected to the RTL 120 (e.g., via a Bluetooth connection) to directly program the RTL 120 using a legacy device model number or a user selected instruction string.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/ or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a computer-implemented method may be performed by at least one processor to cause configuration operations to be performed to configure a reconfigurable device according to a user-presented identification string formed according to one of a plurality of configuration schemes. The operations may include receive a character string from a user device representing user-selected functions of a reconfigurable device. The operations may include determine, based on a first set of rules, whether the character string corresponds to a legacy device identification code of one of a plurality of predetermined legacy devices. The operations may include, in response to determining that the character string corresponds to a legacy device identification code of a legacy device of the plurality of predetermined legacy devices, then perform legacy device configuration operations. The legacy device configuration operations may include retrieve, from a data store, as a function of the legacy device identification code, a data structure defining predetermined device functions according to a predetermined configuration schema corresponding to the legacy device identification code. The legacy device configuration operations may include generate, based on the predetermined device functions retrieved, a first binary machine instruction code to configure the reconfigurable device to perform the predetermined device functions. The legacy device configuration operations may include transmit the first binary machine instruction code to the reconfigurable device such that the reconfigurable device is configured to operate as the legacy device identified by the legacy device identification code. The operations may include, in response to determining that the character string does not correspond to a legacy device identification code of any of the plurality of predetermined legacy devices, then perform standard device configuration operations. The standard device configuration operations may include parse the character string into a second binary machine instruction code based on a second set of rules corresponding to predetermined device functions defined by the character string. The standard device configuration operations may include transmit the second binary machine instruction code to the reconfigurable device.

The operations may include generate the character string from at least one user input signal. The at least one user input signal may include a legacy device identifier. The at least one user input signal may include a set of parameters corresponding to a set of programmable functionalities of the reconfigurable device.

The operations may include, in response to determining predetermined device functions as a function of the character string, generate a signal configured to automatically populate a functionality configuration table of a user display. The functionality configuration table may include visual indicia mapping available settings of the reconfigurable device to the predetermined device functions.

Transmit the first binary machine instruction code to the reconfigurable device such that the reconfigurable device is configured to operate as the legacy device identified by the legacy device identification code may include transmit a signal to the reconfigurable device including the first binary machine instruction code. The signal may be configured to cause the reconfigurable device to store, in an onboard data register of the reconfigurable device, multiple configuration parameters corresponding to predetermined available functions of the reconfigurable device.

Transmit the first binary machine instruction code to the reconfigurable device such that the reconfigurable device is configured to operate as the legacy device identified by the legacy device identification code may include transmit a signal to the reconfigurable device as a function of the first binary machine instruction code. The signal may be configured to cause the reconfigurable device to store, in an onboard data register of the reconfigurable device, a plurality of configuration parameters corresponding to predetermined available functions of the reconfigurable device.

The operations may include generate a configuration table from the first binary machine instruction code according to a predetermined schema for the reconfigurable device corresponding to the predetermined device functions. Transmit the signal to the reconfigurable device may include flashing the configuration table into the onboard data register.

Transmit the signal to the reconfigurable device may include transmitting the first binary machine instruction code to the reconfigurable device such that the reconfigurable device generates the plurality of configuration parameters according to a predetermined set of configuration rules stored onboard the reconfigurable device.

In an illustrative aspect, a computer-implemented method may be performed by at least one processor to cause configuration operations to be performed to configure a reconfigurable device according to a user-presented identification string formed according to one of a plurality of configuration schemes. The operations may include receive a character string from a user device representing user-selected functions of a reconfigurable device. The operations may include determine, based on a first set of rules, whether the character string corresponds to a legacy device identification code of one of a plurality of predetermined legacy devices. The operations may include, in response to determining that the character string corresponds to a legacy device identification code of a legacy device of the plurality of predetermined legacy devices, then perform legacy device configuration operations. The legacy device configuration operations may include identify predetermined device functions corresponding to the legacy device identification code. The legacy device configuration operations may include generate, based on the predetermined device functions identified, a first binary machine instruction code to configure the reconfigurable device to perform the predetermined device functions. The legacy device configuration operations may include transmit the first binary machine instruction code to the reconfigurable device such that the reconfigurable device is configured to operate as the legacy device identified by the legacy device identification code.

The operations may include, in response to determining that the character string does not correspond to a legacy device identification code of any of the plurality of predetermined legacy devices, then perform standard device configuration operations. The standard device configuration operations may include parse the character string into a second binary machine instruction code based on a second set of rules corresponding to predetermined device functions defined by the character string. The standard device configuration operations may include transmit the second binary machine instruction code to the reconfigurable device.

The operations may include generate the character string from at least one user input signal, the at least one user input signal comprising a legacy device identifier.

The operations may include generate the character string from at least one user input signal. The at least one user input signal may include a set of parameters corresponding to a set of programmable functionalities of the reconfigurable device.

The operations may include, in response to determining predetermined device functions as a function of the character string, generate a signal configured to automatically populate a functionality configuration table of a user display. The functionality configuration table may include visual indicia mapping available settings of the reconfigurable device to the predetermined device functions.

Identify predetermined device functions corresponding to the legacy device identification code may include retrieving, from a data store, as a function of the legacy device identification code, a data structure defining the predetermined device functions according to a predetermined configuration schema.

Transmit the first binary machine instruction code to the reconfigurable device such that the reconfigurable device is configured to operate as the legacy device identified by the legacy device identification code may include transmit a signal to the reconfigurable device comprising the first binary machine instruction code. The signal may be configured to cause the reconfigurable device to store, in an onboard data register of the reconfigurable device, a plurality of configuration parameters corresponding to predetermined available functions of the reconfigurable device.

The operations may include generate a configuration table from the first binary machine instruction code according to a predetermined schema for the reconfigurable device corresponding to the predetermined device functions. Transmit the signal to the reconfigurable device may include flashing the configuration table into the onboard data register.

Transmit the signal to the reconfigurable device may include transmitting the first binary machine instruction code to the reconfigurable device such that the reconfigurable device generates the plurality of configuration parameters according to a predetermined set of configuration rules stored onboard the reconfigurable device.

In an illustrative aspect, a system may include a data store including a program of instructions. The system may include at least one processor operably coupled to the data store such that, when the processor executes the program of instructions, the processor causes operations to be performed to configure a reconfigurable device according to a user-presented identification string formed according to one of a plurality of configuration schemes.

The operations may include receive a character string from a user device representing user-selected functions of a reconfigurable device. The operations may include determine, based on a first set of rules, whether the character string corresponds to a legacy device identification code of one of a plurality of predetermined legacy devices. The operations may include, in response to determining that the character string corresponds to a legacy device identification code of a legacy device of the plurality of predetermined legacy devices, then perform legacy device configuration operations.

The legacy device configuration operations may include retrieve, from a data store, as a function of the legacy device identification code, a data structure defining predetermined device functions according to a predetermined configuration schema corresponding to the legacy device identification code. The legacy device configuration operations may include generate, based on the predetermined device functions retrieved, a first binary machine instruction code to configure the reconfigurable device to perform the predetermined device functions. The legacy device configuration operations may include transmit the first binary machine instruction code to the reconfigurable device such that the reconfigurable device is configured to operate as the legacy device identified by the legacy device identification code.

The operations may include, in response to determining that the character string does not correspond to a legacy device identification code of any of the plurality of predetermined legacy devices, then perform standard device configuration operations. The standard device configuration operations may include parse the character string into a second binary machine instruction code based on a second set of rules corresponding to predetermined device functions defined by the character string. The standard device configuration operations may include transmit the second binary machine instruction code to the reconfigurable device.

The system may include a reconfigurable tower light configured to perform multiple configuration schema including a combination of colors and animations at different portion of the reconfigurable tower light, such that the reconfigurable tower light is capable of performing a substantially identical function as the predetermined legacy devices.

The reconfigurable tower light may include a controller and a programmable memory array. The reconfigurable tower light may be configured to receive a user-selected configuration schema comprising a binary machine instruction code and store the received configuration schema to the programmable memory array such that, in operation, the controller operates the reconfigurable tower light based on the configuration schema stored in the programmable memory array.

In some implementations, a system(s) may, for example, be configured to implement a computer-implemented method such as described herein.

In some implementations, a computer program product (CPP) may include a program of instructions tangibly embodied on a non-transitory computer readable medium wherein, when the instructions are executed on a processor, the processor causes operations. The CPP may, by way of example and not limitation, be configured to cause the operations to be performed to implement a method (e.g., a computer-implemented method(s) described herein).

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A computer-implemented method performed by at least one processor to cause configuration operations to be performed to configure a reconfigurable device according to a user-presented identification string formed according to one of a plurality of configuration schemes, the operations comprising:

receive a character string from a user device representing user-selected configuration schema of a reconfigurable device, wherein the user-selected configuration schema comprises a mapping of device behaviors to the reconfigurable device;

determine, based on a first set of rules, whether that the character string corresponds to a legacy device identification code of one of a plurality of predetermined legacy devices;

in response to determining that the character string corresponds to a legacy device identification code of a legacy device of the plurality of predetermined legacy devices, then perform legacy device configuration operations, the legacy device configuration operations comprising:

retrieve, from a data store, as a function of the legacy device identification code, a data structure defining predetermined device functions corresponding to the legacy device identification code;

generate, based on the predetermined device functions retrieved, a first binary machine instruction code to configure the reconfigurable device to perform the predetermined device functions;

and, transmit the first binary machine instruction code to the reconfigurable device such that the reconfigurable device is configured to operate as the legacy device identified by the legacy device identification code; and, receive another character string from another user device representing user-selected configuration schema of the reconfigurable device, wherein the user-selected configuration schema comprises a mapping of device behaviors to the reconfigurable device;

determine, based on the first set of rules, that the another character string does not correspond to a legacy device identification code of any of the plurality of predetermined legacy devices;

in response to determining that the another character string does not correspond to a legacy device identification code of any of the plurality of predetermined legacy devices, then perform standard device configuration operations, the standard device configuration operations comprising: parse the another character string into a second binary machine instruction code based on a second set of rules corresponding to predetermined device functions defined by the another character string, wherein the predetermined device functions comprise device behaviors of another legacy device of the plurality of predetermined legacy devices; and, transmit the second binary machine instruction code to the reconfigurable device.

2. The method of claim 1, further comprising:

generate the character string from at least one user input signal, the at least one user input signal comprising a legacy device identifier.

3. The method of claim 1, further comprising:

generate the character string from at least one user input signal, the at least one user input signal comprising a set of parameters corresponding to a set of programmable functionalities of the reconfigurable device.

4. The method of claim 1, further comprising:

in response to determining predetermined device functions as a function of the character string, generate a signal configured to automatically populate a functionality configuration table of a user display, the functionality configuration table comprising visual indicia mapping available settings of the reconfigurable device to the predetermined device functions.

5. The method of claim 1, wherein transmit the second binary machine instruction code to the reconfigurable device transmission of a configuration mapping to available functions of the reconfigurable device.

6. The method of claim 1, wherein transmit the first binary machine instruction code to the reconfigurable device such that the reconfigurable device is configured to operate as the legacy device identified by the legacy device identification code comprises:

transmit a signal to the reconfigurable device as a function of the first binary machine instruction code, wherein the signal is configured to cause the reconfigurable device to store, in an onboard data register of the reconfigurable device, a plurality of configuration parameters corresponding to predetermined available functions of the reconfigurable device.

7. The method of claim 6, further comprising:

generate a configuration table from the first binary machine instruction code according to a predetermined schema for the reconfigurable device corresponding to the predetermined device functions, wherein transmit the signal to the reconfigurable device comprises flashing the configuration table into the onboard data register.

8. The method of claim 6, wherein:

transmit the signal to the reconfigurable device comprises transmitting the first binary machine instruction code to the reconfigurable device such that the reconfigurable device generates the plurality of configuration parameters according to a predetermined set of configuration rules stored onboard the reconfigurable device.

9. A system comprising:

a data store comprising a program of instructions; and, a processor operably coupled to the data store such that, when the processor executes the program of instructions, the processor causes operations to be performed to configure a reconfigurable device according to a user-presented identification string formed according to one of a plurality of configuration schemes, the operations comprising:

receive a character string from a user device representing user-selected configuration schema of a reconfigurable device, wherein the user-selected configuration schema comprises a mapping of device behaviors to the reconfigurable device;

determine, based on a first set of rules, whether the character string corresponds to a legacy device identification code of one of a plurality of predetermined legacy devices; and, in response to determining that the character string corresponds to a legacy device identification code of a legacy device of the plurality of predetermined legacy devices, wherein the legacy device comprises a device being replaced by the reconfigurable device, then perform legacy device configuration operations, the legacy device configuration operations comprising:

identify predetermined device functions corresponding to the legacy device identification code, wherein the predetermined device functions comprise device behaviors of the legacy device;

generate, based on the predetermined device functions identified, a first binary machine instruction code to configure the reconfigurable device to perform the predetermined device functions; and, transmit the first binary machine instruction code to the reconfigurable device such that the reconfigurable device is configured to operate with the same device behaviors of the legacy device identified by the legacy device identification code;

in response to determining that the character string does not correspond to a legacy device identification code of any of the plurality of predetermined legacy devices, then perform standard device configuration operations, the standard device configuration operations comprising:

parse the character string into a second binary machine instruction code based on a second set of rules corresponding to predetermined device functions defined by the character string; and, transmit the second binary machine instruction code to the reconfigurable device.

10. The system of claim 9, further comprising:

generate the character string from at least one user input signal, the at least one user input signal comprising a legacy device identifier.

11. The system of claim 9, further comprising:

generate the character string from at least one user input signal, the at least one user input signal comprising a set of parameters corresponding to a set of programmable functionalities of the reconfigurable device.

12. The system of claim 9, further comprising:

in response to determining predetermined device functions as a function of the character string, generate a signal configured to automatically populate a functionality configuration table of a user display, the functionality configuration table comprising visual indicia mapping available settings of the reconfigurable device to the predetermined device functions.

13. The system of claim 9, wherein identify predetermined device functions corresponding to the legacy device identification code comprises:

retrieving, from a data store, as a function of the legacy device identification code, a data structure defining the predetermined device functions according to a predetermined configuration schema.

14. The system of claim 9, wherein transmit the first binary machine instruction code to the reconfigurable device is configured such that the reconfigurable device is configured to operate as the legacy device identified by the legacy device identification code comprises:

transmit a signal to the reconfigurable device comprising the first binary machine instruction code, wherein the signal is configured to cause the reconfigurable device to store, in an onboard data register of the reconfigurable device, a plurality of configuration parameters corresponding to predetermined available functions of the reconfigurable device.

15. The system of claim 14, further comprising:

generate a configuration table from the first binary machine instruction code according to a predetermined schema for the reconfigurable device corresponding to the predetermined device functions, wherein transmit the signal to the reconfigurable device comprises flashing the configuration table into the onboard data register.

16. The system of claim 14, wherein:

transmit the signal to the reconfigurable device comprises transmitting the first binary machine instruction code to the reconfigurable device such that the reconfigurable device generates the plurality of configuration parameters according to a predetermined set of configuration rules stored onboard the reconfigurable device.

17. The system of claim 9, wherein the device behaviors comprise color.

18. The system of claim 9, wherein the device behaviors comprise animation.

19. The system of claim 9, wherein the device behaviors comprise brightness.

20. A system comprising:

a data store comprising a program of instructions; and, a processor operably coupled to the data store such that, when the processor executes the program of instructions, the processor causes operations to be performed to configure a reconfigurable device according to a user-presented identification string formed according to one of a plurality of configuration schemes, the operations comprising:

receive a character string from a user device representing user-selected functions of a reconfigurable device;

determine, based on a first set of rules, whether the character string corresponds to a legacy device identification code of one of a plurality of predetermined legacy devices;

in response to determining that the character string corresponds to a legacy device identification code of a legacy device of the plurality of predetermined legacy devices, then perform legacy device configuration operations, the legacy device configuration operations comprising:

retrieve, from a data store, as a function of the legacy device identification code, a data structure defining predetermined device functions according to a predetermined configuration schema corresponding to the legacy device identification code, wherein the predetermined device functions comprise device behaviors of the legacy device;

generate, based on the predetermined device functions retrieved, a first binary machine instruction code to configure the reconfigurable device to perform the predetermined device functions; and, transmit the first binary machine instruction code to the reconfigurable device such that the reconfigurable device is configured to operate as the legacy device identified by the legacy device identification code; and, in response to determining that the character string does not correspond to a legacy device identification code of any of the plurality of predetermined legacy devices, then perform standard device configuration operations, the standard device configuration operations comprising:

parse the character string into a second binary machine instruction code based on a second set of rules corresponding to predetermined device functions defined by the character string; and, transmit the second binary machine instruction code to the reconfigurable device.

21. The system of claim 20, further comprising a reconfigurable tower light configured to perform multiple configuration schema comprising a combination of colors and animations at different portion of the reconfigurable tower light, such that the reconfigurable tower light is capable of performing a substantially identical function as the predetermined legacy devices.

22. The system of claim 21, wherein the reconfigurable tower light comprises a controller and a programmable memory array, wherein:

the reconfigurable tower light is configured to receive a user-selected configuration schema comprising a binary machine instruction code; and, store the received configuration schema to the programmable memory array such that, in operation, the controller operates the reconfigurable tower light based on the configuration schema stored in the programmable memory array.

\* \* \* \* \*